United States Patent
Ishii (10) Patent No.: US 8,559,805 B2
(45) Date of Patent: Oct. 15, 2013

(54) IMAGE-PICKUP APPARATUS AND FOCUS CONTROL METHOD

(75) Inventor: Kazunori Ishii, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 13/082,106

(22) Filed: Apr. 7, 2011

(65) Prior Publication Data

US 2011/0181769 A1 Jul. 28, 2011

Related U.S. Application Data

(62) Division of application No. 12/833,482, filed on Jul. 9, 2010, now Pat. No. 7,945,150, which is a division of application No. 11/778,243, filed on Jul. 16, 2007, now Pat. No. 7,773,873.

(30) Foreign Application Priority Data

Jul. 25, 2006 (JP) ................... 2006-201998

(51) Int. Cl.
*G03B 3/00* (2006.01)
*H04N 5/232* (2006.01)

(52) U.S. Cl.
USPC ......................... 396/104; 348/353

(58) Field of Classification Search
USPC ......................... 396/104; 348/353
See application file for complete search history.

(56) References Cited

U.S. PATENT DOCUMENTS

| 7,773,873 B2 * | 8/2010 | Ishii ............................... 396/104 |
| 2005/0185083 A1 * | 8/2005 | Okawara ....................... 348/345 |

FOREIGN PATENT DOCUMENTS

| JP | 2002-335439 A | 11/2002 |
| JP | 2005-121819 A | 5/2005 |
| JP | 2005-195793 A | 7/2005 |
| JP | 2005-234325 A | 9/2005 |
| JP | 2006-171145 A | 6/2006 |

OTHER PUBLICATIONS

The above foreign patent documents were cited in a May 24, 2011 Japanese Office Action, a which is not enclosed, that issued in Japanese Patent Application No. 2006-201998.

* cited by examiner

*Primary Examiner* — Clayton E LaBalle
*Assistant Examiner* — Noam Reisner
(74) *Attorney, Agent, or Firm* — Cowan, Liebowitz & Latman, P.C.

(57) ABSTRACT

An image-pickup apparatus is disclosed which is capable of restricting unnecessary focus control by an AF method other than the TV-AF method in the hybrid AF. The image-pickup apparatus includes a first detector which generates first information corresponding to a contrast state of a picked-up image, a second detector which detects second information differing from the first information and used for focus control, and a controller which performs focus processing that cyclically repeats first focus control using the first information and performs second focus control using the second information. In the focus processing, the controller is changed over between a state of restricting the second focus control and a state of allowing the second focus control, depending on a change amount of the contrast state.

11 Claims, 8 Drawing Sheets

IMAGE-PICKUP APPARATUS AND FOCUS CONTROL METHOD

CROSS-REFERENCE TO RELATED APPLICATIONS

This application is a divisional of application Ser. No. 12/833,482, filed Jul. 9, 2010, now U.S. Pat. No. 7,945,150 which is a divisional of application Ser. No. 11/778,243, filed Jul. 16, 2007, now U.S. Pat. No. 7,773,873, the entire disclosures of which are hereby incorporated by reference.

BACKGROUND OF THE INVENTION

As the auto-focus (AF) control of a video camera, etc., the TV-AF method is located in the mainstream thereof, which generates AF evaluation value signals expressing sharpness (contrast state) of video signals generated using image-pickup elements, and searches for the focus lens position where the AF evaluation value signals are maximum.

In addition, there is an external ranging method (that is, the external phase difference detection method) in the AF method, which has a ranging sensor provided independently from an image-pickup lens, calculates the in-focus position of the focus lens based on the distance to an object detected by the ranging sensor, and moves the focus lens to the in-focus position.

In the external phase difference detection method, a light flux received from the object is divided into two, and a pair of light-receiving element arrays (line sensors) receive the two-divided light fluxes, respectively. The method detects a shift amount between the images formed on the pair of line sensors, that is, a phase difference, obtains the object distance based on the phase difference by using triangulation, and moves the focus lens to an in-focus position corresponding to the object distance.

Further, there is a hybrid AF method having the above-described AF methods combined therein. In the hybrid AF method, for example, after the internal phase difference detection method drives the focus lens to the vicinity of an in-focus position, the method further accurately drives the focus lens to the in-focus position by the TV-AF method (see Japanese Patent Laid-Open No. 5-64056). Also, there is another hybrid AF method in which the external phase difference detection method and the TV-AF method are combined (see Japanese Patent Laid-Open No. 2005-234325). The hybrid AF method disclosed in Japanese Patent Laid-Open No. 2005-234325 selects a method using the focus control, of the TV-AF method and the external phase difference detection method, depending on change amounts of the respective signals in these methods.

The above-described hybrid AF method moves the focus lens to the vicinity of the in-focus position by the AF method other than the TV-AF method, and changes the AF method to the TV-AF method only when the AF evaluation value is higher than a predetermined level (that is, in a case of being close to the in-focus position) at this moment to move the focus lens to the in-focus position.

However, the AF evaluation value fluctuates in accordance with a change in the picture of the object regardless of a change in the object distance. In this case, if initially the focus lens is always moved by an AF method other than the TV-AF method, the focus will change even in an image-pickup condition in which the focus is not required to change, thereby generating unnecessary blur of the picked-up image. In particular, in an image-pickup apparatus for moving images in which the images are recorded during the AF operation, a blurred moving image will be recorded due to such unnecessary operations.

Also, when the external phase difference detection method is used as an AF method other than the TV-AF method, a parallax occurs between the image-pickup area of an image-pickup lens and the ranging field of a ranging sensor. If the parallax occurs, the focus lens is subjected to movement since the object distance detected by the external ranging sensor changes although an in-focus state is obtained in the TV-AF method. That is, unnecessary blur of the picked-up image occurs.

Further, the external phase difference detection method is not necessarily a highly reliable detection method of object distances when the objects include near one and far one, the object has an alternate pattern such as a stripe pattern, and the object has a low contrast. Also, in the external phase difference detection method, the detection accuracy of the object distances is reduced due to movement of the object and hand jiggling of a user.

Still further, although the determination conditions of reliability for detection of object distances can be tightened up, this takes much time for determination, which deteriorates high speed focusing performance that is a feature of the external phase difference detection method.

BRIEF SUMMARY OF THE INVENTION

The present invention provides an image-pickup apparatus and a focus control method, each of which is capable of restricting unnecessary focus control by an AF method other than the TV-AF method in the hybrid AF in which the TV-AF method and an AF method other than the TV-AF method are combined.

According to an aspect, the present invention provides an image-pickup apparatus including a first detector which generates first information corresponding to a contrast state of a picked-up image, a second detector which detects second information differing from the first information and used for focus control, and a controller which performs focus processing that cyclically repeats first focus control using the first information and performs second focus control using the second information. In the focus processing, the controller is changed over between a state of restricting the second focus control and a state of allowing the second focus control, depending on a change amount of the contrast state.

According to another aspect, the present invention provides a focus control method, including a step of acquiring a first information corresponding to the contrast state of a picked-up image, a step of acquiring a second information differing from the first information and used for focus control, and a control step of performing focus processing that cyclically repeats first focus control using the first information and performing second focus control using the second information. In the focus processing in the control step, a focus control state is changed over between a state of restricting the second focus control and a state of allowing the second focus control, depending on a change amount of the contrast state.

Other objects and features of the present invention will become apparent from the following description and the attached drawings.

DETAILED DESCRIPTION OF THE PREFERRED EMBODIMENTS

Preferred embodiments of the present invention will hereinafter be described with reference to the accompanying drawings.

First Embodiment

Figure 1:
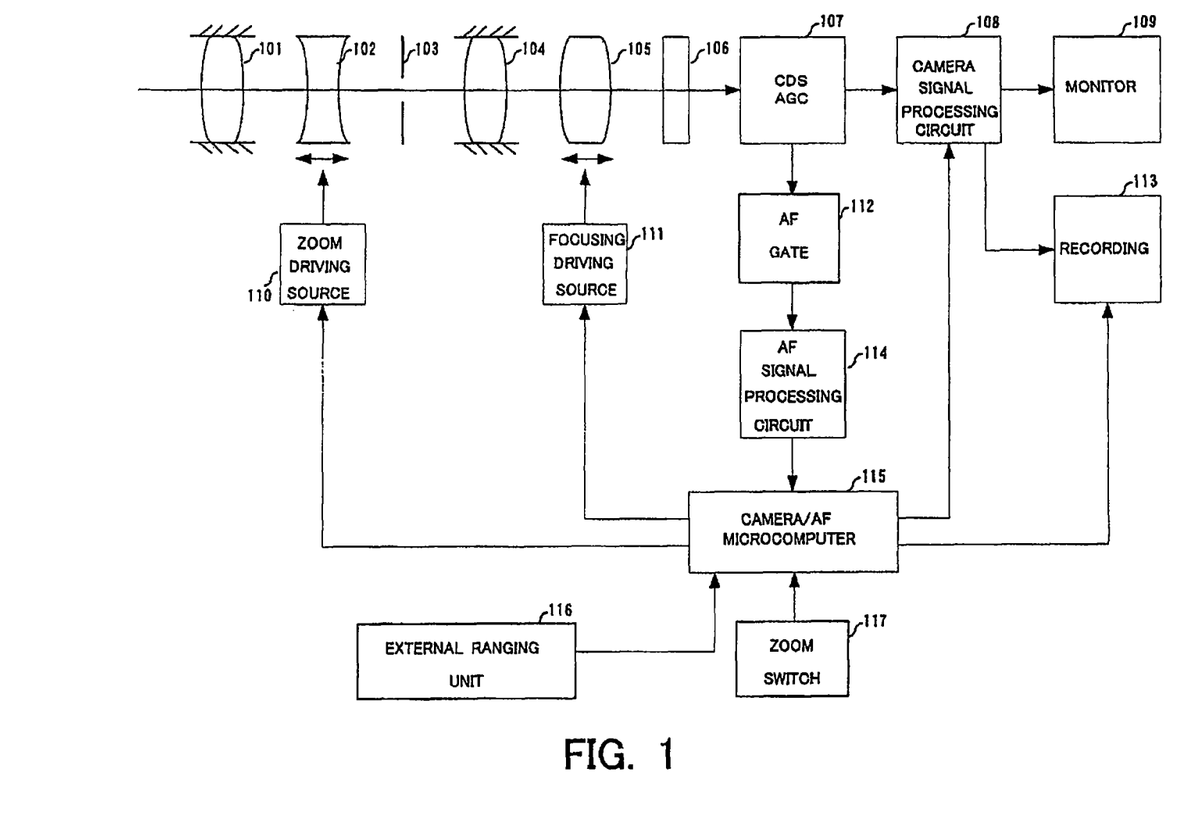
FIG. 1 is a block diagram showing the configuration of a video camera which is a first embodiment of the present invention.

FIG. 1 shows the configuration of a video camera (image-pickup apparatus) which is first embodiment of the present invention. Although, in the present embodiment, a description is made of a video camera, alternative embodiments of the present invention include other image-pickup apparatuses such as a digital still camera.

In FIG. 1, reference numeral 101 denotes a first fixed lens, 102 denotes a magnification-varying lens that moves in the optical axis direction to vary the magnification, and 103 denotes an aperture stop. Reference numeral 104 denotes a second fixed lens, and 105 denotes a focus compensator lens (hereinafter, referred to as a focus lens) which has a function of compensating for variation of a focal plane associated with varying the magnification and a focusing function. The first fixed lens 101, the magnification-varying lens 102, the aperture stop 103, the second fixed lens 104 and the focus lens 105 constitute an image-pickup optical system.

Reference numeral 106 denotes an image-pickup element serving as a photoelectric conversion element formed of a CCD sensor or a CMOS sensor. Reference numeral 107 denotes a CDS/AGC circuit that samples the output of the image-pickup element 106 and adjusts its gain.

Reference numeral 108 denotes a camera signal processing circuit which carries out various types of image processes on the output signal from the CDS/AGC circuit 107 and generates a video signal. Reference numeral 109 denotes a monitor formed of an LCD, or the like which displays the video signal from the camera signal processing circuit 108. Reference numeral 113 denotes a recorder which records the video signal from the camera signal processing circuit 108 on a recording medium such as a magnetic tape, an optical disk, a semiconductor memory.

Reference numeral 110 denotes a zoom-driving source which moves the magnification-varying lens 102. Reference numeral 111 denotes a focus-driving source which moves the focus lens 105. The zoom-driving source 110 and the focus-driving source 111 are each formed of an actuator such as a stepping motor, a DC motor, a vibration type motor and a voice coil motor.

Reference numeral 112 denotes an AF gate which passes only signals within an area used for focus detection among output signals of all pixels from the CDS/AGC circuit 107.

Reference numeral 114 denotes an AF signal processing circuit serving as first detector. The AF signal processing circuit 114 extracts high-frequency components from the signals passed through the AF gate 112 or luminance difference components (differential between the maximum value and the minimum value of the luminance level of the signal passed through the AF gate 112) generated from the high-frequency components to generate an AF evaluation value signal as first information.

The AF evaluation value signal is output to a camera/AF microcomputer 115. The AF evaluation value signal represents sharpness (contrast state) of a picked-up image (video) generated based on the output signal from the image-pickup element 106. The sharpness changes according to the focus state of the image-pickup optical system, so that the AF evaluation value signal resultantly is a signal which represents the focus state of the image-pickup optical system.

The camera/AF microcomputer 115 (hereinafter, simply referred to as a microcomputer) serving as a controller governs control of operations of the entire video camera, and performs focus control which controls the focus-driving source 114 to move the focus lens 105. The microcomputer 115 performs as the focus control, first focus control by the TV-AF method (hereinafter, simply referred to as TV-AF) and second focus control by the external-phase-difference detection (external-ranging) method (hereinafter, simply referred to as external-ranging AF).

Reference numeral 117 denotes a zoom switch. The microcomputer 115 moves the magnification-varying lens 102 via the zoom-driving source 110 in response to an operation of the zoom switch 117 by a user. At this time, the microcomputer 115 drives the focus lens 105 via the focus-driving source 111 in order to compensate for the variation of the focal plane associated with varying the magnification.

Reference numeral 116 denotes an external-ranging unit serving as a second detector and outputs a signal corresponding to a distance to an object (second information; the signal is hereinafter referred to as object distance information).

Figure 6:
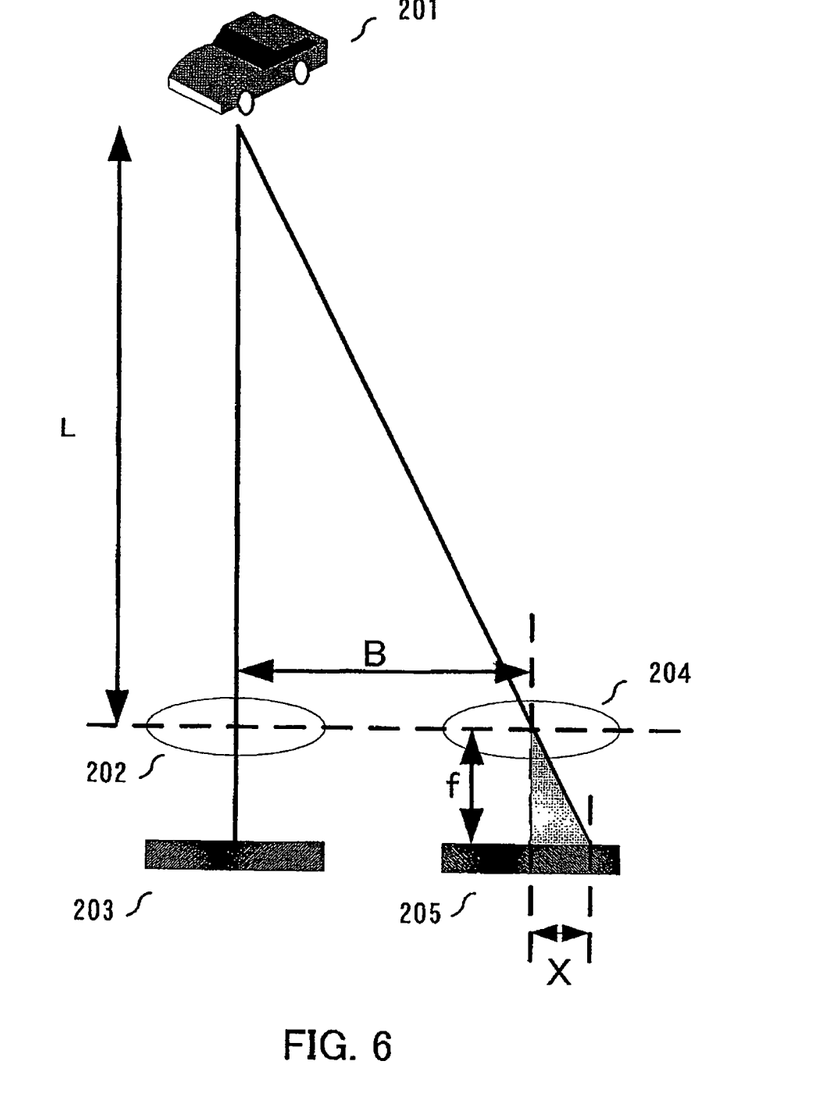
FIG. 6 is a view showing a ranging principle of a passive phase difference method.
Figure 7:
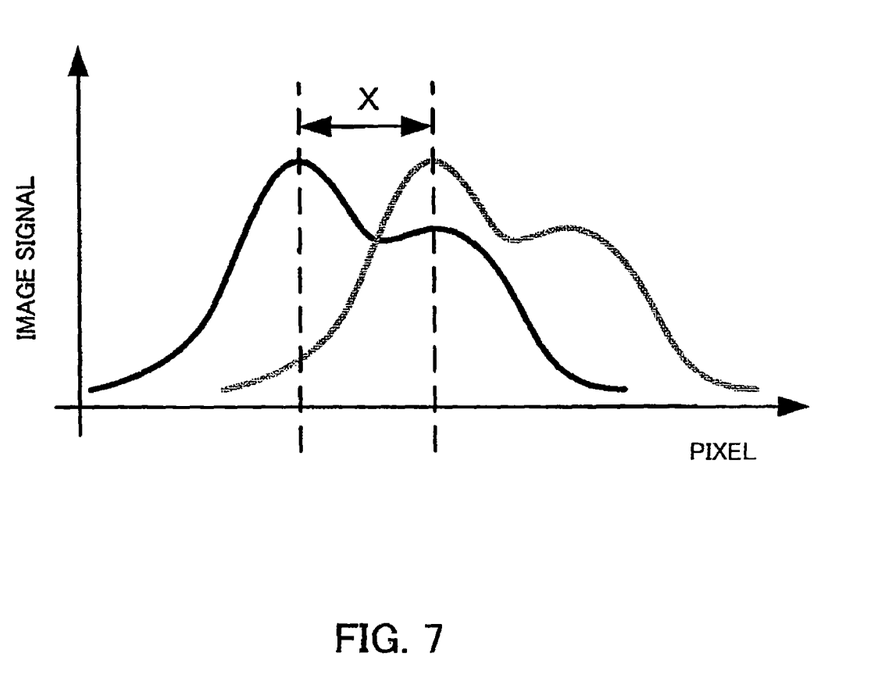
FIG. 7 is a view showing image signals in the passive phase difference method.

Various types of methods have conventionally been used as ranging methods. FIGS. 6 and 7 show the principle of ranging by a passive phase difference method that is one of the methods. The external-ranging unit 116 is provided individually from the image-pickup optical system. That is, light from an object, which does not pass through the image-pickup optical system, enters the external-ranging unit 116.

In FIG. 6, reference numeral 201 denotes an object, 202 denotes a first image-forming lens, 203 denotes a first light-receiving element array, 204 denotes a second image-forming lens, and 205 denotes a second light-receiving element array. The first and second light-receiving element arrays 203 and 205 are each constituted by plural light-receiving elements (pixels) arranged in a line. The first and second light-receiving element arrays 203 and 205 are spaced apart from each other by a base length B.

A part of light from the object 201, having passed through the first image-forming lens 202, forms an image on the first light-receiving element array 203 while another part of the light, having passed through the second image-forming lens 204, forms an image on the second light-receiving element array 205.

FIG. 7 shows an example of output signals (image signals) from the first and second light-receiving element arrays 203 and 205. Since the first and second light-receiving element arrays 203 and 205 are spaced apart from each other by the base length B, the image signal from the first light-receiving element array 203 and that from the second light-receiving element array 205 are shifted from each other by X pixels.

Accordingly, it is possible to acquire X by calculating the correlation between the two image signals with pixel shifts and determining the amount of pixel shift (also referred to as the phase difference) at which the correlation is at the maximum. Using X, the base length B, and a focal length f of the image-forming lenses 202 and 204, a distance L to the object 201 can be calculated on the basis of the principle of triangulation by the following expression (1):

$$L = B \times f / X \quad (1).$$

Note that, in alternative embodiments of the present invention, ranging methods are not limited to the above-described passive ranging method, that is, any other ranging method may be used. For example, a method which projects infrared rays and calculates an object distance on the basis of the principle of triangulation or a method which measures a propagation velocity of an ultrasonic wave using an ultrasonic sensor may be used as an active ranging method. Alternatively, the microcomputer may calculate an object distance on the basis of X (second information) by causing the external-ranging unit to output a signal corresponding to the amount X of pixel shift described above.

The object distance information from the external-ranging unit 116 is input into the microcomputer 115. The microcomputer 115 calculates a focus lens position (hereinafter, referred to as an external-ranging-in-focus position) at which an in-focus state is obtained on an object at the distance corresponding to the object distance information. The 'calculation' herein includes not only a calculation using an calculation expression but also reading out data corresponding to the in-focus position for the object distance, the data being stored in a memory (not shown) in advance.

Next, referring to FIG. 2 through FIG. 5, a description will be given of AF processing (focus processing) performed by the microcomputer 115. The AF processing is performed according to a computer program stored in the microcomputer 115.

First, using FIG. 2, a description will be given of the entire procedure of the AF processing.

In Step (abbreviated as 'S' in the FIG. 201, the microcomputer 115 starts the processing. The processing shown in the figure is repeatedly at a read-out cycle (first cycle) of reading out an image-pickup signal from the image-pickup element 111 for generating, for example, a one-field image. That is, the processing is performed cyclically.

In Step 202, the microcomputer 115 performs the TV-AF. The TV-AF includes an operation of obtaining an in-focus state by driving the focus lens 105 while monitoring the AF evaluation value. The TV-AF also includes a process for maintaining the in-focus state, such as a process for determining whether or not the AF evaluation value is reduced after the in-focus state is obtained. A description will be given later of detailed processes of the TV-AF using FIG. 3.

In Step 203, the microcomputer 115 detects an object distance (object distance information) with the external-ranging unit 116 and further calculates an external-ranging-in-focus position based on that object distance information.

In Step 204, the microcomputer 115 determines whether or not the current mode is a phase-difference-using mode. When the current mode is the phase-difference-using mode, the process proceeds to Step 208. When the current mode is not the phase-difference-using mode, the process proceeds to Step 205. The phase-difference-using mode is a mode that permits the external-ranging AF to be performed, in which the focus lens 105 is moved to the external-ranging-in-focus position only when a predetermined condition is satisfied in Step 210 described later.

In Step 205, the microcomputer 115 sets threshold values (first and second values, hereinafter referred to as first and second threshold value, respectively) that are used to determine whether or not the contrast and the object distance greatly change in Step 206 described later.

In Step 206, the microcomputer 115 determines a change relating to the object using the contrast information and the object distance information in order to determine whether or not the mode should be changed to the phase-difference-using mode. That is, the microcomputer 115 determines whether or not a change amount of the contrast information acquired in the previous routine (read-out cycle) with respect to the contrast information acquired in the current routine is greater than the first threshold value. The microcomputer 115 also determines whether or not a change amount of the object distance information acquired in the previous routine with respect to the object distance information acquired in the current routine is greater than the second threshold value.

In the present embodiment, the microcomputer 115 acquires differences between the maximum value and the minimum value of the luminance levels at respective pixel lines of the signals passed through the AF gate 112, the signals being obtained from the AF signal processing circuit 114. Then, the microcomputer 115 uses the maximum value of these differences as the contrast information. The AF evaluation value common to the contrast information in view of representing the contrast state may be compared with a threshold value instead of the contrast information.

In Step 206, when it is determined that the change amount of the contrast information is greater than the first threshold value and the change amount of the object distance is greater than the second threshold value, the process proceeds to Step 207 where the microcomputer 115 changes the mode to the phase-difference-using mode. On the other hand, when it is determined that at least one of the change amounts of the contrast information and object distance information is smaller than the corresponding threshold value, the process returns to Step 202 without changing to the phase-difference-using mode, and the microcomputer 115 performs the TV-AF therein. That is, when at least one of the change amounts of the contrast information and object distance information is smaller than the corresponding threshold value, only the TV-AF is repeated at the above-described read-out cycle of the image-pickup signal.

Although a description is given of a case where it is determined whether or not the change amount of the object distance information is greater than the second threshold value in the present embodiment, determination may be made in regard to a change amount of the external-ranging-in-focus position calculated based on the object distance information in Step 203. This is equivalent to the determination with respect to the change amount of the object distance information.

The determination in this Step 206 is the first stage determination to change over whether or not the focus lens 105 is moved using the object distance information (or information of the external-ranging-in-focus position), that is, whether or not the external-ranging AF is performed. In other words, the condition (timing) to drive the focus lens 105 by the external-ranging AF is restricted to a case where the contrast state of the object has greatly changed and the object distance has also greatly changed.

Accordingly, when the contrast information (AF evaluation value) has greatly changed due to a change in the picture of the object though the object distance does not greatly change and thereby an in-focus state is maintained, it is possible to prevent unnecessary blur of the picked-up image from occurring due to the initial movement of the focus lens to the external-ranging-in-focus position as in the conventional Hybrid AF method. Further, in a case where the calculated object distance information has a high possibility of error occurring due to a parallax between the image-pickup area of the image-pickup optical system and the detection field of the external-ranging unit 116 though an in-focus state is obtained by the TV-AF, the focus lens can be prevented from being moved to the external-ranging-in-focus position.

When the mode is changed to the phase-difference-using mode, the process proceeds to Step 208. In Step 208, the microcomputer 115 is determines whether or not the mode is the phase-difference-drive mode. However, if the mode has already been set to the phase-difference-drive mode and thereby the focus lens 105 is being moved toward the external-ranging-in-focus position, the process returns to Step 202.

On the other hand, if the mode is not the phase-difference-drive mode, the process proceeds to Step 209. In Step 209, the microcomputer 115 sets a threshold value (third value) that is used for determination in subsequent Step 210. Specifically, the microcomputer 115 sets in Step 209 a focus-position-difference threshold value th for determining whether or not it should move the focus lens 105 to the external-ranging-in-focus position (that is, whether or not the microcomputer 115 should perform the external-ranging AF). The focus-position-difference threshold value th is determined in consideration of variations in detection of the object distance by the external-ranging unit 116.

In Step 210, the microcomputer 115 calculates a difference (absolute value) between the external-ranging-in-focus position obtained in Step 203 and the current focus lens position, and then determines whether or not the difference is greater than the focus-position-difference threshold value th set in Step 209. When the difference is greater than the focus-position-difference threshold value th, the process proceeds to Step 211, and when the difference is smaller than the focus-position-difference threshold value th, the process proceeds to S213.

The determination in Step 210 is the second stage determination to change over whether or not the external-ranging AF is performed. In other words, the condition (timing) to drive the focus lens 105 by the external-ranging AF is restricted to a case where the difference between the external-ranging-in-focus position and the current focus lens position is large.

The reason why the external-ranging AF is not performed when the condition of the second stage determination is not satisfied is that the in-focus accuracy in the external-ranging AF is reduced as compared to that in the TV-AF. If the focus lens 105 is inappropriately moved to the external-ranging-in-focus position, hunting between the TV-AF and the external-ranging AF or blur of the picked-up image may occur.

In Step 211, the microcomputer 115 changes the mode to the phase-difference-drive mode. Then, in Step 212, the microcomputer 115 moves the focus lens 105 toward the external-ranging-in-focus position. Next, the process proceeds to Step 215.

In Step 213, the microcomputer 115 determines how long time has elapsed since the change to the phase-difference-using mode. The elapsed time is obtained by an increment of a time counter in Step 216.

When the external-ranging AF is not performed even if a predetermined time (first time) has elapsed, the process proceeds to Step 214 where the microcomputer 115 terminates the phase-difference-using mode. Then, in Step 215, the microcomputer 115 clears the time counter.

The case where the phase-difference-using mode is terminated in Step 214 is a case where the external-ranging-in-focus position is close to the current focus lens position though the mode is changed over to the phase-difference-using mode due to a change in the object and a change in the object distance.

Specifically, there may be a case where, since the timing of a detection operation of the object distance shifts with respect to that of the TV-AF depending on object states and image-pickup conditions, the focus lens 105 has already been driven to the vicinity of the in-focus position by the TV-AF at the timing of the detection operation of the object distance. In such a case, if the focus lens 105 is inappropriately moved to the external-ranging-in-focus position, blur of the picked-up image may occur.

For this reason, in the present embodiment, in a case where the predetermined time has elapsed without execution of the external-ranging AF after the mode is changed to the phase-difference-using mode, the phase-difference-using mode is terminated. This enables to prevent occurrence of the blur of the picked-up image due to the inappropriate drive of the focus lens by the external-ranging AF and hunting due to frequent changeover of the AF control between the TV-AF and the external-ranging AF.

Figure 3:
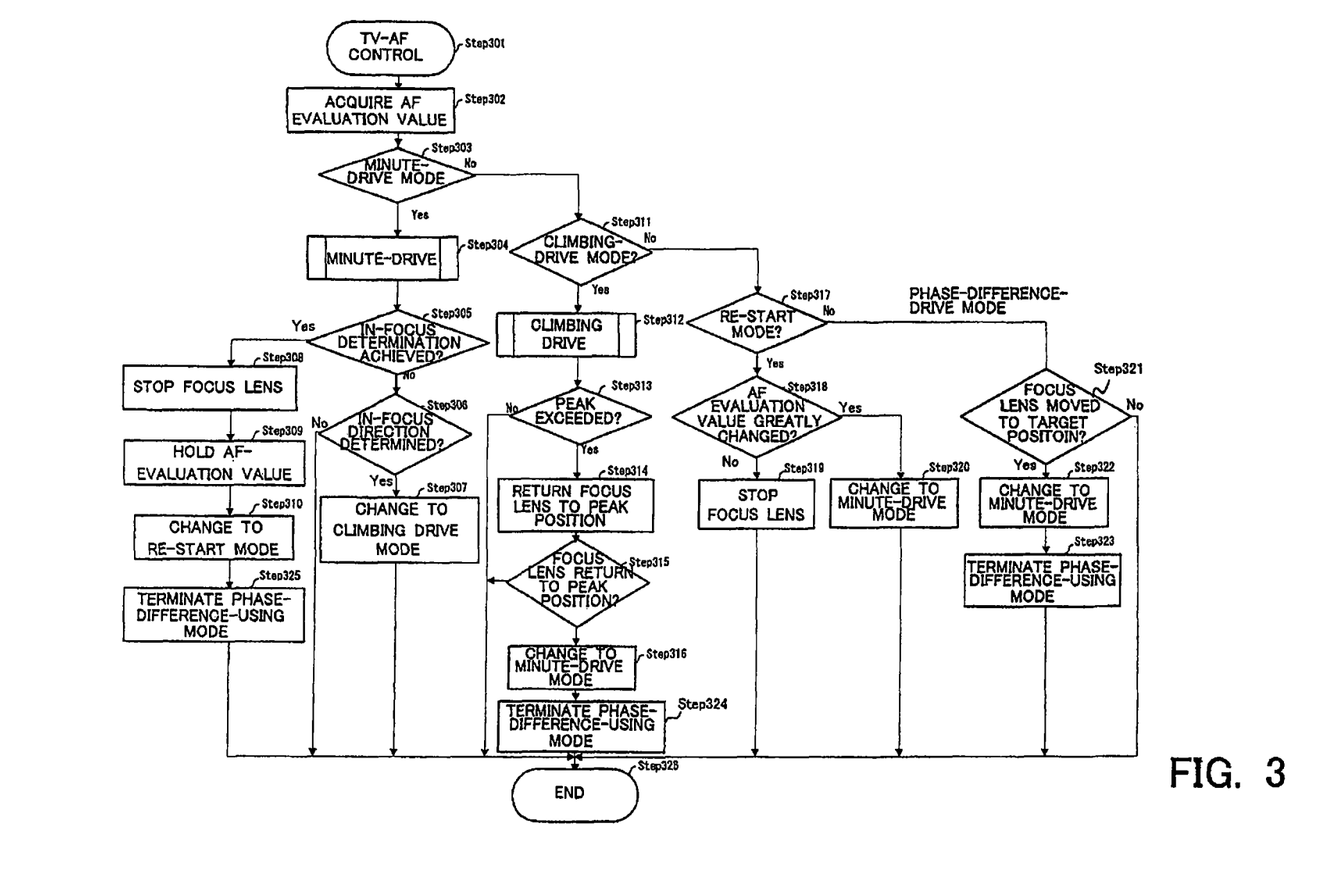
FIG. 3 is a flowchart showing the procedure of TV-AF control in the first embodiment.

Next, a description will be made of the TV-AF with reference to FIG. 3.

In Step 301, the microcomputer 115 starts processes of the TV-AF.

In Step 302, the microcomputer 115 acquires the AF evaluation value output from the AF signal processing circuit 114.

In Step 303, the microcomputer 115 determines whether or not the current mode in the TV-AF is a minute-drive mode. If the current mode in the TV-AF is the minute-drive mode, the process proceeds to Step 304. If it is not, the process proceeds to Step 311.

In Step 304, the microcomputer 115 performs the minute driving operation of the focus lens 105 to determine whether or not an in-focus state is obtained and which direction the in-focus position (hereinafter, referred to as an "in-focus direction") is with respect to the current focus lens position. A description will be made later of the minute driving operation with reference to FIG. 4.

The control performing the minute driving operation of the focus lens 105 in order to determine whether or not the in-focus state is obtained on the basis of changes in the AF evaluation value is also referred to as in-focus-confirmation control.

Moreover, the control performing the minute driving operation of the focus lens 105 in order to determine the in-focus direction on the basis of changes of the AF evaluation value is also referred to as in-focus-direction-determination control.

In Step 305, the microcomputer 115 determines whether or not the in-focus determination could be made in Step 304. When the in-focus determination could be made, the process proceeds to Step 308 where the microcomputer 115 stops the drive of the focus lens 105. At this point, in Step 309, the microcomputer 115 stores the AF evaluation value at the in-focus position in a memory (not shown).

Then, in Step 310, the microcomputer 115 changes the mode to a re-start mode. Further, the microcomputer 115 terminates the phase-difference-using mode in Step 325. This prevents unnecessary blur of the picked-up image caused due to the movement of the focus lens 105 to the external-ranging-in-focus position obtained by the external-ranging AF from a state in which the in-focus determination by the TV-AF was made and thereby the focus lens 105 was stopped.

When the microcomputer 115 determines that the in-focus-determination could not be made in Step 305, the process proceeds to Step 306.

In Step 306, the microcomputer 115 determines whether or not the in-focus-direction determination could be made in Step 304. When the in-focus-direction determination could be made, the process proceeds to Step 307 where the microcomputer 115 changes the mode to a climbing-drive mode. When the in-focus-direction determination could not be made, the microcomputer 115 continues the minute-drive operation.

In Step 311, the microcomputer 115 determines whether or not the mode is the climbing-drive mode. If the mode is the climbing-drive mode, the process proceeds to Step 312, and if it is not, the process proceeds to Step 317.

In Step 312, the microcomputer 115 performs the climbing drive (in-focus-position-detection control) of the focus lens 105 at a predetermined speed. A detailed description will be given later of the climbing drive with reference to FIG. 5.

In Step 313, the microcomputer 115 determines in the climbing drive whether or not the AF evaluation value exceeds its peak. If the peak is exceeded, the process proceeds to Step 314. If it is not, the microcomputer 115 continues the climbing drive.

In Step 314, the microcomputer 115 causes the focus lens 105 to return to a position where the AF evaluation value during the climbing drive becomes the peak value (hereinafter, referred to as a peak position).

Next, in Step 315, the microcomputer 115 determines whether or not the focus lens 105 has returned to the peak position. If the focus lens 105 has returned to the peak position, the process proceeds to Step 316 where the microcomputer 115 changes the mode to the minute-drive mode. If it has not returned yet, the microcomputer 115 continuously causes the focus lens 105 to return to the peak position.

Further, the process proceeds from Step 316 to Step 324 where the microcomputer 115 terminates the phase-difference-using mode. This prevents unnecessary blur of the picked-up image from occurring due to the movement of the focus lens 105 to the external-ranging-in-focus position by the external-ranging AF though the in-focus position (the peak position) has been determined in the climbing-drive mode and thereby the focus lens 105 has been moved to the in-focus position.

In Step 317, the microcomputer 115 determines whether or not the mode is the re-start mode. If the mode is the re-start mode, the process proceeds to Step 318, and if it is not, the process proceeds to Step 321.

In Step 318, the microcomputer 115 compares the AF evaluation value stored in Step 309 with the latest AF evaluation value to determine whether or not the difference therebetween, that is, a variation of the AF evaluation value is greater than a predetermined value. When the variation of the AF evaluation value is greater than the predetermined value, the process proceeds to Step 320 where the microcomputer 115 changes the mode to the minute-drive mode. When the variation of the AF evaluation value is smaller than the predetermined value, the process proceeds to Step 319 where the microcomputer 115 keeps the focus lens 105 stopped.

The timing of the procession to Step 321 is the time when the focus lens 105 is being moved toward the external-ranging-in-focus position by the phase-difference-drive mode. In this Step 321, the microcomputer 115 determines whether or not the focus lens 105 has reached the external-ranging-in-focus position as a target position. When the focus lens 105 has reached the external-ranging-in-focus position, the process proceeds to Step 322 where the microcomputer 115 changes the mode to the minute-drive mode. Then, the microcomputer 115 terminates the phase-difference-using mode in Step 323 to allow the TV-AF (the minute-drive mode, that is, the in-focus-confirmation control or the in-focus-direction-determination control in Step 304). When the focus lens 105 has not reached the external-ranging-in-focus position, the microcomputer 115 continues the drive of the focus lens 105 to the external-ranging-in-focus position.

Figure 4:
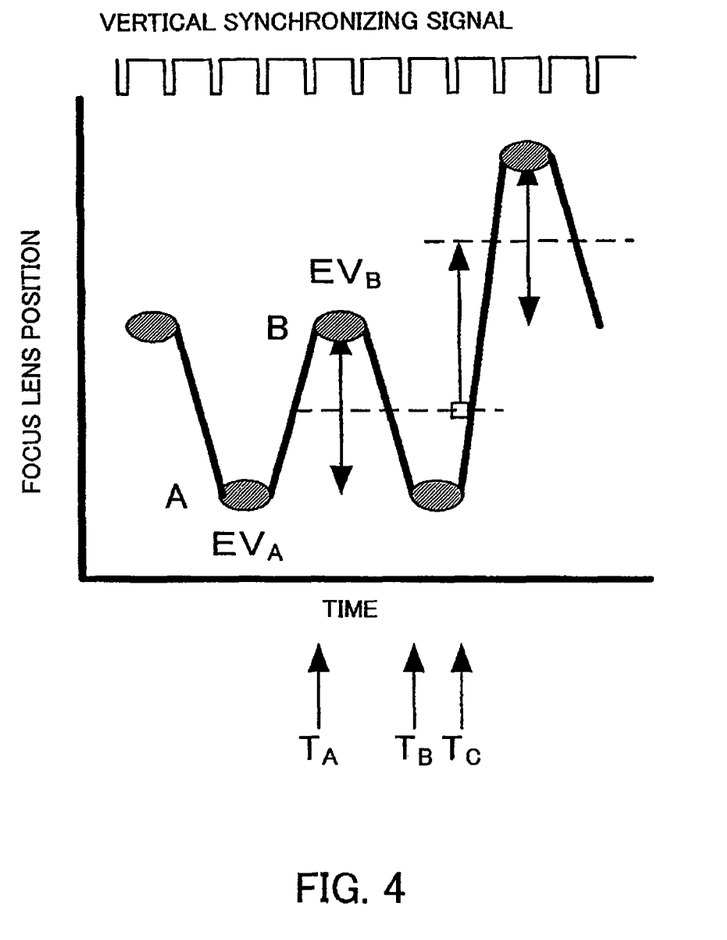
FIG. 4 is a schematic diagram describing a minute-drive operation in the TV-AF control.

Next, a description will be made of the minute-drive operation with reference to FIG. 4. FIG. 4 shows the relationship between the movement of the focus lens 105 and the change in the AF evaluation value in the minute-drive operation. The horizontal axis shows time, and the vertical axis shows the focus lens position. A vertical synchronizing signal of the video signal is shown at the upper part of the figure.

The AF evaluation value EVA corresponding to electric charges (shown by a hatched ellipse) accumulated in the image-pickup element 106 in the time period A is taken in at time TA, and the AF evaluation value EVB corresponding to electric charges accumulated in the image-pickup element 106 in the time period B is taken in at time TB. The AF evaluation values EVA and EVB are compared with each other at time TC. If EVB>EVA, the drive (vibration) center of the minute drive is shifted (drive amplitude=vibration amplitude+center movement amplitude). On the other hand, if EVA>EVB, the vibration center is not moved (drive amplitude=vibration amplitude). The minute-drive operation is performed, with the movement of the focus lens 105 in this way, for detecting the direction in which the AF evaluation value increases and for searching for the focus lens position (peak position) at which the AF evaluation value is at the maximum.

Next, a description will be made of the climbing-drive operation with reference to FIG. 5. In the climbing-drive operation, with a high-speed drive of the focus lens 105, the peak position at which the peak of the AF evaluation value is obtained or the vicinity thereof is detected.

Figure 5:
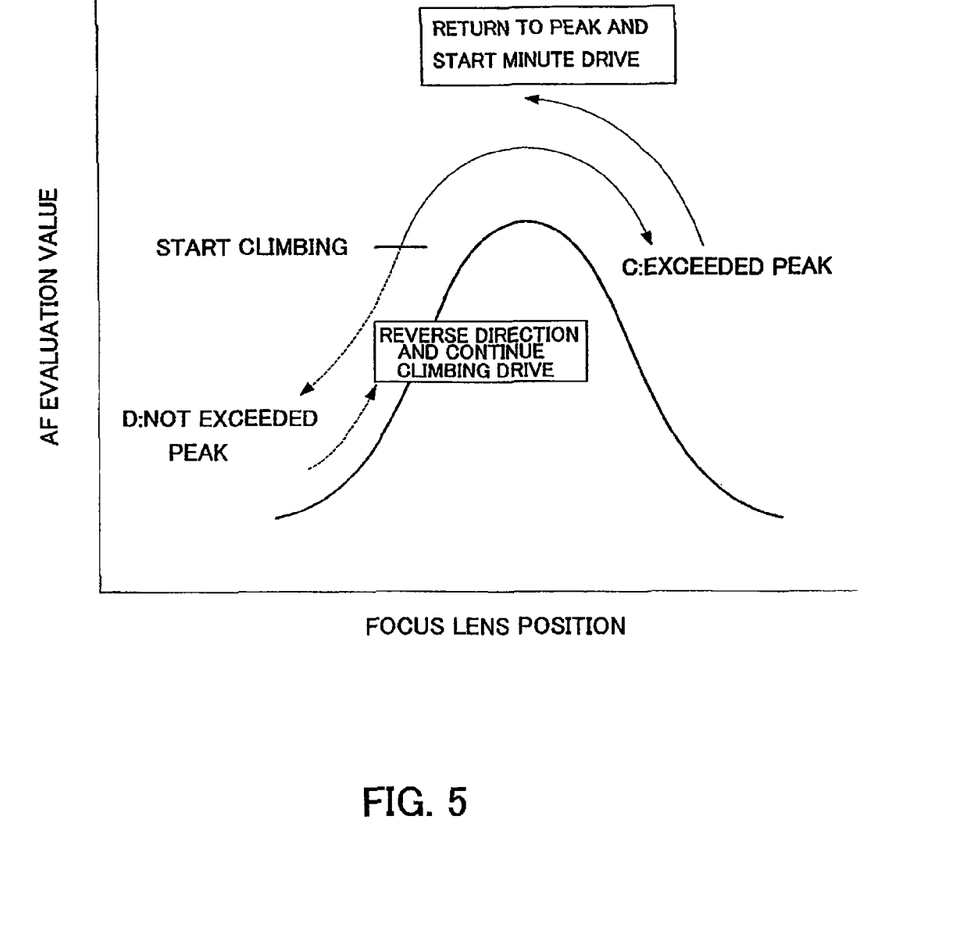
FIG. 5 is a schematic diagram describing a climbing-drive operation in the TV-AF control.

FIG. 5 shows the relationship between the movement of the focus lens 105 and the change in the AF evaluation values in the climbing-drive operation. In the movement shown by C, since the AF evaluation value decreases after exceeding the peak, the existence of the peak position (in-focus position) can be confirmed and therefore the climbing-drive operation is terminated to perform the minute-drive operation. On the other hand, in the movement shown by D, since the AF evaluation value has no peak and monotonously decreases, so that it can be determined that the current drive direction of the focus lens 105 is erroneous. In this case, the drive direction is reversed and then the climbing-drive operation is continued.

Second Embodiment

Figure 8:
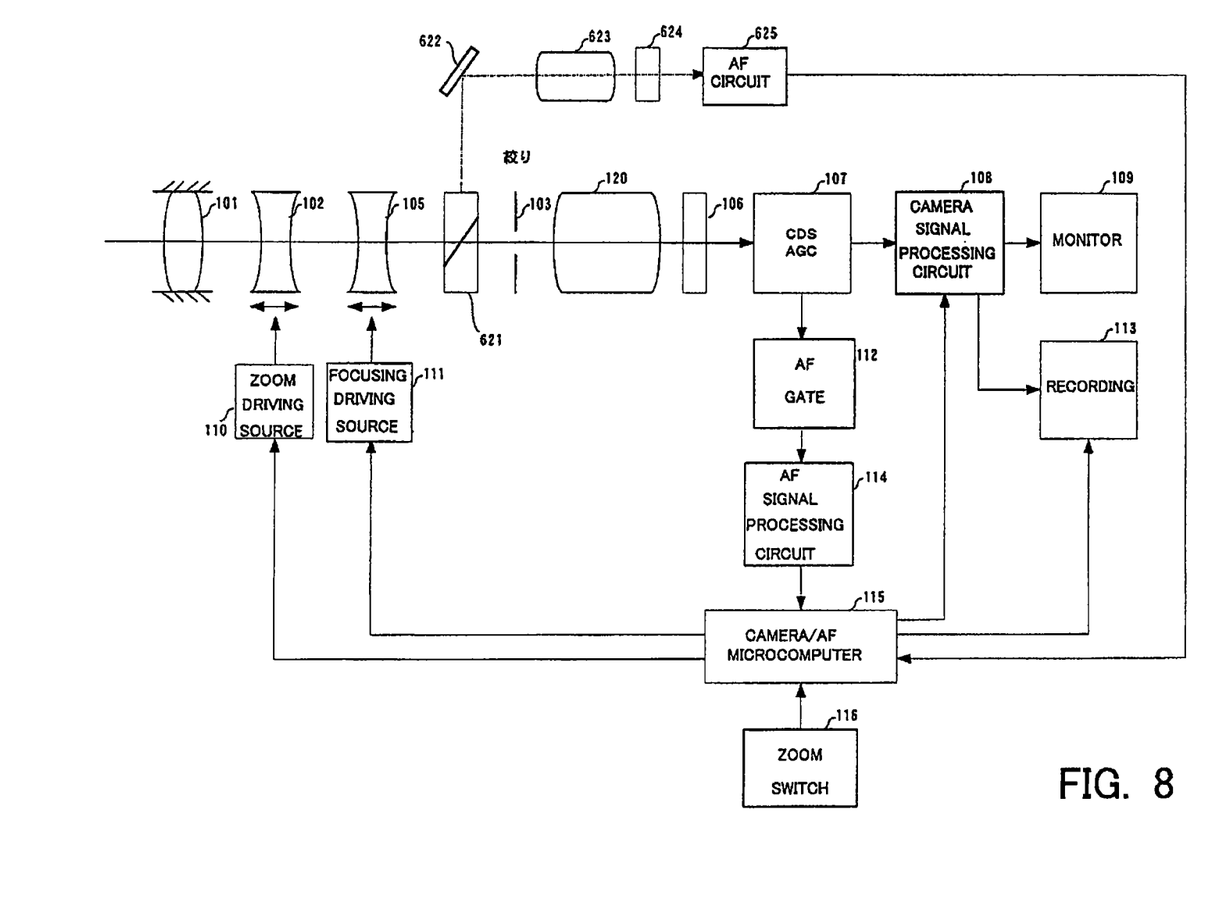
FIG. 8 is a block diagram showing the configuration of a video camera which is a second embodiment of the present invention.

FIG. 8 shows the configuration of a video camera which is a second embodiment of the present invention. In the present embodiment, components common to those of the first embodiment are given the same reference numerals, and descriptions thereof are omitted.

In the first embodiment, although a description was given of the case of employing the external phase-difference direction (external-ranging) method, the present embodiment employs a TTL phase-difference detection (internal-phase-difference) method.

In the present embodiment, the image-pickup optical system is constituted by a first fixed lens 101, a magnification-varying lens 102, a focus lens 105, an aperture stop 103 and a second fixed lens 120 in the order from the object side.

Reference numeral 621 denotes a half prism which is disposed between the focus lens 105 and the aperture stop 103. The half prism 621 divides a light flux proceeding from the focus lens 105 toward the aperture stop 103 into a light flux component proceeding to the image-pickup element 106 and a light flux component proceeding to an AF sensor 624, which will be described later.

Since the aperture stop 103 always operates while picking up a moving image (video), the entering light flux is divided by the half prism 621 disposed on the side closer to an object than the aperture stop 103.

Reference numeral 622 denotes a sub-mirror that reflects a light flux component divided by the half prism 621, and reference numeral 623 denotes an image-forming lens that causes the light flux component reflected by the sub-mirror 622 to form an image on the AF sensor 624. The AF sensor 624 includes a pair of light-receiving element arrays (line sensors) for auto-focus (AF) by the phase-difference detection method.

Reference numeral 625 denotes an AF circuit that calculates a phase difference between two image signals formed on the pair of line sensors of the AF sensor 624.

The microcomputer 115 acquires a defocus amount and a defocus direction based on information on the phase difference (phase-difference information, that is, second information) from the AF circuit 625.

In the video camera thus constructed, the AF processing can be performed as in the first embodiment by acquiring the defocus amount and the defocus direction instead of the object distance information in the AF processing (FIG. 2) described in the first embodiment.

Figure 2:
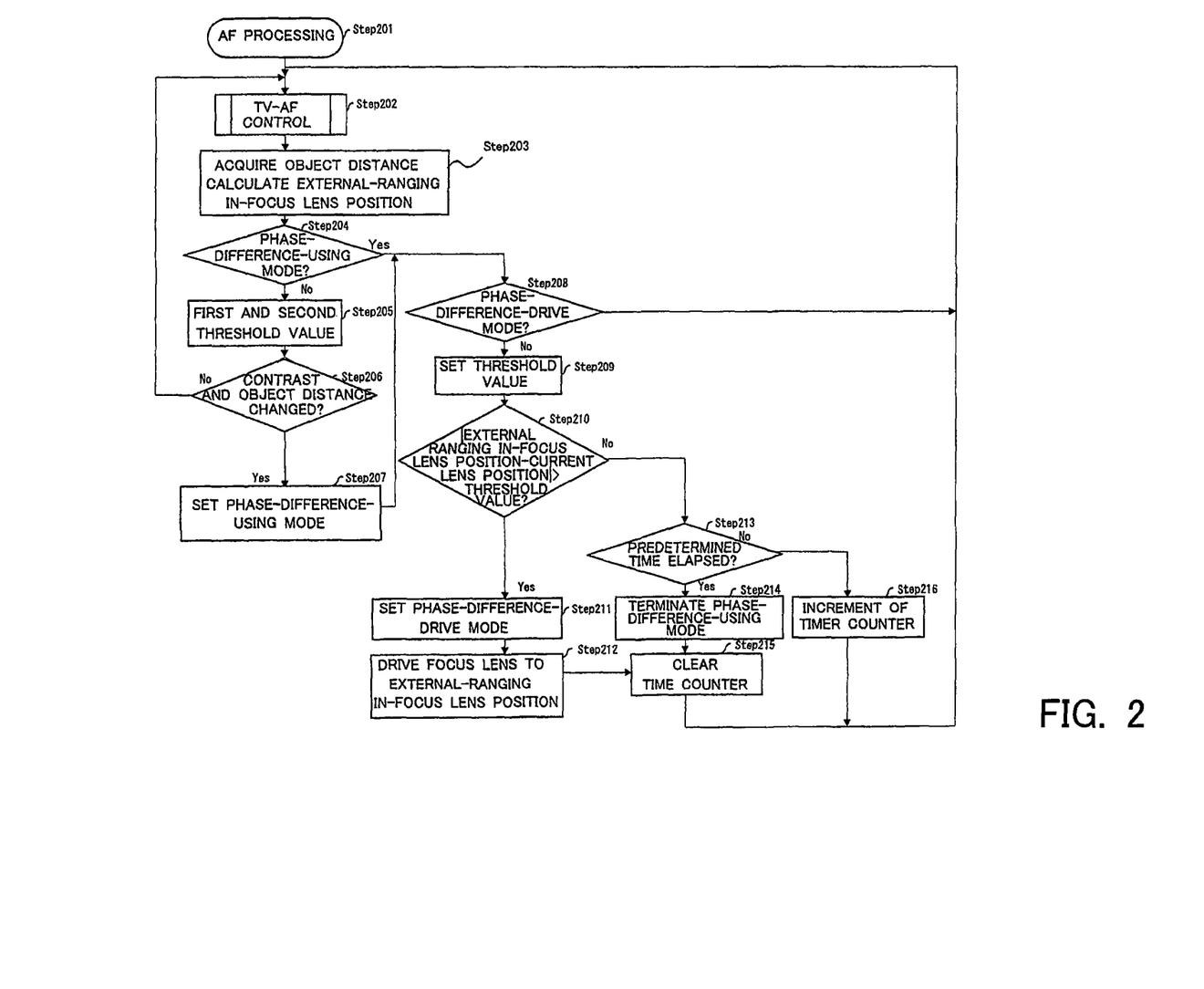
FIG. 2 is a flowchart showing the procedure of AF processing in the first embodiment.

Specifically, in Step 203 of FIG. 2, the microcomputer 115 calculates the defocus amount and the defocus direction based on the phase-difference information from the AF circuit 625.

Further, in Step 206, the microcomputer 115 compares the change amount of the contrast information of the picked-up image with the first threshold value, and calculates the change amount of the object distance from the defocus amount to compare it with the second threshold value.

In Step 210, the microcomputer 115 calculates an in-focus position (internal-phase-difference-in-focus position) of the focus lens 105 by the phase-difference detection method from the defocus amount and the defocus direction. Then, the microcomputer 115 determines whether or not the difference between the internal-phase-difference-in-focus position and the current focus lens position is greater than the focus position difference threshold value th.

As described above, in each of the embodiments, the AF method in which the TV-AF and the phase-difference (external-ranging, internal-phase-difference) AF are combined has the following features;

That is, when the contrast state of the picked-up image of the object and the phase-difference information (the object distance or the defocus amount) greatly change, the mode is changed over to a mode allowing the phase difference AF. This can prevent blur of the picked-up image from occurring due to execution of the phase-difference AF before the TV-AF is activated in response to a change in the picture of the object though the object distance does not change. In addition, this can prevent blur of the picked-up image from occurring due to execution of the phase-difference AF in a case where, although an in-focus state has been achieved, the object distance changes due to hand jiggling or a parallax.

In other words, the above-described embodiments can restrict or perform the second focus control depending on at least the change amount of the contrast state of the picked-up image, in the focus processing using the first information.

Therefore, the second focus control can be appropriately performed during the focus processing, thereby enabling to prevent unnecessary blur of the picked-up image from occurring due to inappropriate execution of the second focus control from an in-focus state achieved by the first focus control.

Further, when the predetermined time has been elapsed without the phase-difference AF being performed after the mode is changed over to the mode using the phase-difference AF, that mode is terminated. This is particularly effective in a case where the reliability of the phase-difference information is low due to the object state and the image-pickup conditions, etc. That is, blur of the picked-up image can be prevented from occurring due to movement of the focus lens by the phase-difference AF based on the phase-difference information with low reliability, after the focus lens has been driven to an in-focus position by the TV-AF prior to execution of the phase-difference AF.

Still further, in each of the above-described embodiments, the condition in Step 210 is required as the final condition to change over to the phase-difference-drive mode in order to execute the phase-difference AF in the phase-difference-using mode. The final condition is that the difference between the external or internal-phase-difference-in-focus position and the current focus lens position is greater than the threshold value.

However, alternative embodiments of the present invention are not limited thereto. For example, the final condition may be that, with respect to the current focus lens position, the in-focus direction determined by the in-focus-direction-determination control of the TV-AF and the direction of the external or internal-phase-difference-in-focus position are identical to each other.

In addition, the mode may be immediately changed over to the phase-difference-drive mode when so-called panning or tilting is detected using a shake sensor for an image stabilization system.

Furthermore, the present invention is not limited to these preferred embodiments and various variations and modifications may be made without departing from the scope of the present invention.

This application claims foreign priority benefits based on Japanese Patent Application No. 2006-201998, filed on Jul. 25, 2006, which is hereby incorporated by reference herein in its entirety as if fully set forth herein.

What is claimed is:

1. An image-pickup apparatus comprising:
   a first detector which generates first information corresponding to a contrast state of a picked-up image;
   a second detector which detects second information corresponding to a subject distance based on a detected shift amount between two images using a phase difference detection method; and
   a controller which controls a focus lens cyclically using the first information and controls the focus lens using the second information, wherein the controller moves the focus lens in a direction in which the contrast state of the picked-up image increases,
   wherein the controller controls the focus lens using the second information when a change amount of the contrast and a change amount of the subject distance exceed each threshold value respectively during a control of moving the focus lens using the first information without using the second information so that the contrast state of the picked-up image increases, and wherein the controller restricts the control of the focus lens using the second information when at least one of both the change amount of the contrast and the change amount of the subject distance do not exceed the each threshold value during the control of moving the focus lens using the first information without using the second information so that the contrast state of the picked-up image increases.

2. The image-pickup apparatus according to claim 1, wherein the controller repeats the control of the focus lens using the first information at a first cycle, and the controller is changed over between the state of restricting the control of the focus lens using the second information and the state of allowing the control of the focus lens using the second information, depending on the change amount of the contrast state within the first cycle.

3. The image-pickup apparatus according to claim 1, wherein the controller is brought into the state of restricting the control of the focus lens using the second information when the change amount of the contrast state is smaller than a first value, and the controller is brought into the state of allowing the control of the focus lens using the second information when the change amount of the contrast state is greater than the first value.

4. The image-pickup apparatus according to claim 1, wherein the controller is changed over between the state of restricting the control of the focus lens using the second information and the state of allowing the control of the focus lens using the second information, depending on the change amount of the contrast state and a change amount of the second information.

5. The image-pickup apparatus according to claim 4, wherein the controller repeats the control of the focus lens using the first information at a first cycle, and the controller is changed over between the state of restricting the control of the focus lens using the second information and the state of allowing the control of the focus lens using the second information in the focus processing, depending on the change amount of the contrast state within the first cycle and the change amount of the second information within the first cycle.

6. The image-pickup apparatus according to claim 5, wherein the controller is brought into the state of restricting the control of the focus lens using the second information in a case where the change amount of the contrast state within the first cycle is smaller than a first value, and in a case where the change amount of the second information within the first cycle is smaller than a second value, and the controller is brought into the state of allowing the control of the focus lens using the second information in a case where the change amount of the contrast state within the first cycle is greater than the first value and the change amount of the second information within the first cycle is greater than the second value.

7. The image-pickup apparatus according to claim 1, wherein the controller performs the control of the focus lens using the second information in a case where the controller is brought into the state of allowing the control of the focus lens using the second information in the focus processing and third information differing from the first information and the second information satisfies a predetermined condition.

8. The image-pickup apparatus according to claim 7, further comprising a position detector which detects the position of a focus lens, wherein the third information is a difference between an in-focus position of the focus lens which is calculated by using the second information and the position of the focus lens which is detected by the position detector, and the predetermined condition is that the difference is greater than a third value.

9. The image-pickup apparatus according to claim 7, wherein the third information includes a direction of the in-focus position of the focus lens which is determined by using the first information and a direction of the in-focus position of the focus lens which is calculated by using the second information, and the predetermined condition is that the two directions are coincident with each other.

10. The image-pickup apparatus according to claim 1, wherein the second detector outputs the second information corresponding to an object distance.

11. The image-pickup apparatus according to claim 1, wherein the controller restricts the control of the focus lens using the second information in a case where the controller is brought into the state of allowing the control of the focus lens using the second information in the focus processing and does not perform the control of the focus lens using the second information for a first time or more.

\* \* \* \* \*